April 24, 1951 — G. A. WIEDEMER — 2,550,508
TIRE GAUGE
Filed June 7, 1949
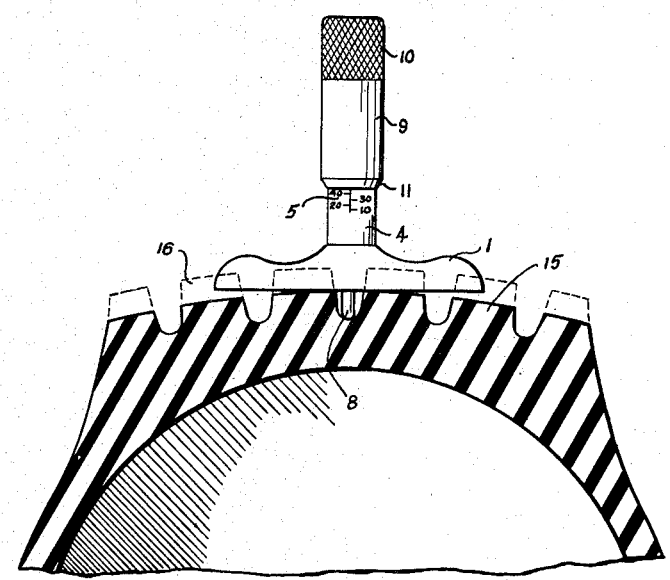
fig-1
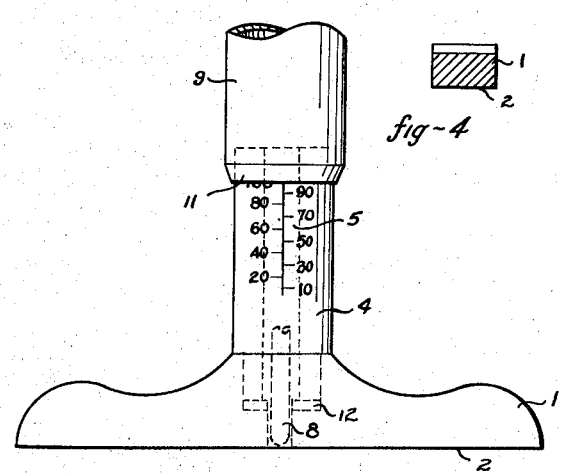
fig-2
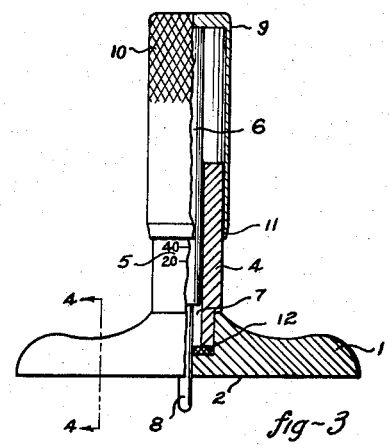
fig-3
fig-4
INVENTOR.
GEORGE A. WIEDEMER
BY
ATTORNEY Patented Apr. 24, 1951

2,550,508

UNITED STATES PATENT OFFICE 2,550,508

TIRE GAUGE

George A. Wiedemer, Akron, Ohio, assignor to Seiberling Rubber Company, Barberton, Ohio, a corporation of Delaware Application June 7, 1949, Serial No. 97,626

1 Claim. (Cl. 33—169)

This invention relates to a method of determining the replacement cost of a tire which has failed by reason of some defect in its structure. The method is applicable to any tire having a tread designed with projections, whether the projections be ribs or buttons or of some other shape. The replacement cost as determined according to this invention is based on the fractional amount of these projections which have been worn away when the replacement is made.

In the tire industry, a continued source of irritation has existed between the tire manufacturer, the retail distributor or dealer, and the customer, in matters pertaining to price adjustment for defective tires. Heretofore the dealer himself has not been in a position to make replacement price adjustments on defective tires without the risk of personal loss. It has been the practice, that when a customer presented such a claim to a dealer, the dealer sent the tire to the manufacturer and the manufacturer alone determined what adjustment, if any, was to be made on the tire. Obviously, this involved considerable delay and annoyance to the customer, and frequently the adjustment made by the manufacturer was not equitable, since there was no standard on which to base such claims. To preserve customer good-will, the dealer has often absorbed the loss himself in order to make a price adjustment which he considered fair.

The method of this invention provides a uniform standard upon which such claims may be based and it permits the dealer to make immediate adjustment when such a claim is presented by a customer. The replacement cost is determined by using a depth gauge of the plunger type which is especially calibrated. The entire length of the scale represents the original height of the tread projections. The scale is calibrated in fractions of this unit length, preferably decimal fractions. The scale is correlated with the plunger so that when applied to a tire the tread of which has been worn smooth, the reading is unity or one hundred percent, indicating that the entire tread has been worn away. When the base of the gauge is in contact with the worn surface of the projections and the head of the plunger is in contact with the tire surface between the projections the scale reads directly the fraction or per cent of the projections which has been worn away. The cost to the customer of a replacement tire is ordinarily the product of the scale reading and the list price of a new tire. A correction factor may be applied. For instance, if the manufacturer desires to assign some small value to the tire when worn smooth, the length of the scale will not represent one unit, but only a fraction of a unit such as nine-tenths. Whether or not any correction factor is applied, the method permits a fair and reasonable adjustment to be made immediately by the dealer to the satisfaction of the customer.

The invention will be further described in connection with the drawings, in which—

Fig. 1 is a view of a cross section through a tire with a depth gauge of a preferred type positioned across the projections of the tire tread with the plunger protruding therefrom between two projections;

Fig. 2 is an enlarged view of the depth gauge and showing the full scale with the decimal fraction calibration;

Fig. 3 is a side elevation of the gauge which is partially broken away to show the interior thereof; and Fig. 4 is a view taken on the line 4—4 of Fig. 3.

The gauge consists of a base 1 which is solid, and has a flat underside 2. The base is rectangular in cross section, as shown in Fig. 4. The barrel 4 of the gauge is attached to the center of the top of the base. It is cylindrical and a scale 5 is etched into its surface. Plunger 6 is adapted to slide axially through the barrel in channel 7. The bottom of this channel is of narrowed cross section to accommodate the head 8 of the plunger. The upper end of the plunger 6 is attached to a cylindrical cap 9, the inner surface of which is adapted to slide over the outside of barrel 4. The plunger is slid back and forth through the barrel of the gauge by moving the cap 9. Knurling 10 facilitates manipulation of the gauge. The lower edge of cap 9 is beveled to a sharp edge 11 to serve as the indicator for the scale 5. Rubber washer 12 is located between the bottom of the barrel and the base and projects into the bottom of channel 7 to fit tightly around the plunger and prevent slippage after a measurement has been made.

An enlargement of the gauge with the cap raised to expose the whole of scale 5, is shown in Fig. 2. The entire scale is of unit length and represents the height of the tire-tread projections when new. The calibrations on the scale are in decimal fractions. It can be seen from Fig. 2 that when the head 8 of the plunger has been retracted into the gauge so that it is just even with the undersurface 2 of the base, the scale reads one hundred per cent which indicates that all of the original tread has been removed from the tire. This will be the reading when the gauge is applied to a tire the tread of which has been worn smooth.

In the preferred gauge several different scales are provided on different faces of the barrel. The one hundred per cent point of each is at the same level on the barrel 4. The different scales are designed for use with tires which when new had tread projections of different heights. Regardless of the size or tread design of the tires made by any manufacturer, the same scale is to be used in determining the replacement value of all tires which when new had tread projections of the same height. Thus a gauge with as few as four or five scales on it may be used for calculating the replacement costs of a whole line of tires of different sizes, etc. In using the gauge a dealer may consult a chart which classifies the different tires according to which scale of the gauge is to be used.

In carrying out the method of this invention a gauge is positioned in contact with the worn surface of the tread projections 15 as shown in Fig. 1. The broken line 16 above tread projections 15 indicates the height of the projections when the tire was new. In order to make a fair price adjustment projections near the center of the tread where the wear seems to be the least are selected for measurement. First, the plunger head 8 of the gauge is extended out of the base 1 and is positioned on the bottom of the groove between two tread projections. Then the gauge is slid downwardly over the plunger until its underside 2 is in contact with the top of the worn projections. The gauge will lie transversely of the tread when properly positioned. The decimal fraction of the original tread height which has been worn off the tire then is shown by the indicator edge 11. If the gauge is provided with several scales, the value is, of course, read from the appropriate scale. The reading obtained on the scale may be then multiplied by the list price of a new tire of the same size and design, and the product thus obtained is the amount which the customer will be charged for a new tire. Such a calculation is easily and quickly made by the dealer.

The following example illustrates such a transaction. The scale 5 of the gauge as it is positioned on the tread of Fig. 1 shows a reading of between 40 and 50 per cent. This indicates, therefore, that 40 to 50 per cent of the tread of the tire had been worn away by the customer before the defect in the tire became apparent. In fairness to the customer, the smaller figure is selected and it is considered that the customer used 40 per cent of the defective tire. If the value of a new tire to replace this defective tire is twenty dollars, he is, therefore, charged 40 per cent of list price of twenty dollars—or eight dollars for a replacement tire. The taxes and other miscellaneous charges connected with the sale of the tire are allowed in the same proportion.

This method assures all tire users of a fair estimate of the wear they have received from defective tires. It provides a dealer with a method of making immediate adjustment on the tire and does not alienate his customer's goodwill. The many inequities and annoyances which formerly arose among the parties to these transactions are eliminated. After making the adjustment the dealer sends the tire to the manufacturer and he is reimbursed accordingly.

It is recognized, of course, that other type gauges may be used for this purpose. The method outlined herein and the scale using decimal fractions has been found to be most convenient.

What I claim is:

A depth gauge of the plunger type for measuring tire wear, the base of which gauge is solid and has a flat underside, a cylindrical barrel attached at the center of the top of the base, a plurality of scales on the outer surface of the barrel, a channel through the barrel and a plunger located therein, a cap fitting over the end of the barrel to which the plunger is attached, the bottom edge of the cap movable over the scales and beveled to a sharp edge to serve as the indicator for the scales, each scale of different unit length to correspond to the original tread depth of certain tires, each scale decreasing downwardly and divided into decimal fractions with the 100 per cent position on all of the scales indicated by the bottom edge of the cap when the bottom of the plunger is level with the bottom of the base, and a rubber cushion between the bottom of the barrel and the base which projects into the channel in contact with the plunger to prevent slippage of the plunger after a reading has been made.

GEORGE A. WIEDEMER.

REFERENCES CITED

The following references are of record in the file of this patent:

UNITED STATES PATENTS

| Number | Name | Date |
|---|---|---|
| 440,621 | Curran | Nov. 18, 1890 |
| 763,076 | Spalding | June 21, 1904 |
| 794,031 | Lehman | July 4, 1905 |
| 1,553,387 | McDermott | Sept. 15, 1925 |
| 1,601,407 | Murray | Sept. 28, 1926 |
| 2,190,899 | Vierling | Feb. 20, 1940 |